March 26, 1929.　　E. L. LARSON ET AL　　1,706,855
INFLATION VALVE
Filed May 25, 1925
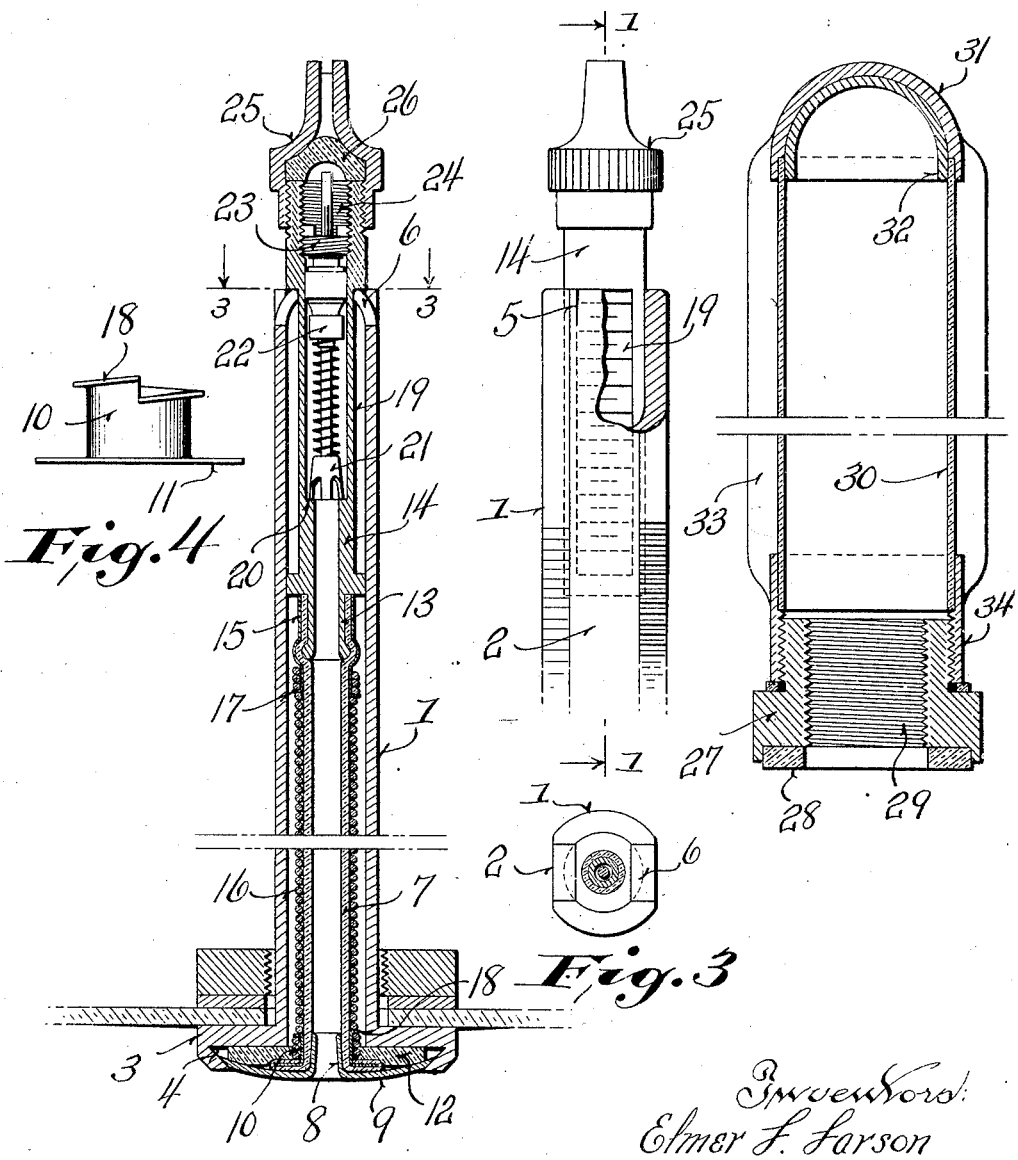

Patented Mar. 26, 1929.

1,706,855

UNITED STATES PATENT OFFICE.

ELMER L. LARSON AND CHARLES A. BRAUNGER, OF OCONOMOWOC, WISCONSIN.

INFLATION VALVE.

Application filed May 25, 1925. Serial No. 32,683.

This invention relates to inflation valves and automobile tires.

Objects of this invention are to provide an inflation valve which will indicate the pressure of air within the tire, and which, although equipped with the air pressure indicating means is nevertheless of standard length and standard diameter as compared with the ordinary nipples ordinarily supplied by automobile dealers.

Further objects are to provide a pressure indicating inflation valve which uses the standard equipment of filling valve, cap and similar parts.

Further objects are to provide a pressure indicating inflation valve which is so constructed that the main body of the nipple is open throughout and devoid of sections of different bore, and in which the extensible scale bearing member may be slipped in from one end of the nipple and may be most readily secured in place by a simple process. This, it will be appreciated, greatly expedites and simplifies the manufacture of pressure indicating inflation valves and materially reduces the cost thereof.

The invention pertains specifically to an air inflation nipple or air inflation stem, commonly known as valve stem, in combination with an air pressure gauge to be rigidly fastened to the air container of a pneumatic tire.

The object of this invention is to combine the functions of a standard inflation and valve stem with the functions of a pressure gauge.

This unit fastened air tight to the air container of a pneumatic tire performs two distinct and separate services, that of conducting and retaining the air and that of indicating the pressure of the air with the container.

Further objects of this invention are to restrict and confine the structures of this device, as far as this is possible, exclusively to the structures and details of the standard inflation stem and so eliminate complexities of structure and manipulation and costliness.

Observing a standard valve stem it is readily noticed that one end of the stem is reduced in diameter to form the receiving nipple which is rigid and an integral part of the stem. Separating and placing this receiving nipple slidably into the stem made the present invention possible.

An embodiment of the invention is shown in the accompanying drawings, in which:—

Figure 1 is a vertical sectional view through the valve, such view corresponding to a section on the line 1—1 of Figure 2.

Figure 2 is a side elevation thereof taken at right angles to Figure 1.

Figure 3 is a sectional view on the line 3—3 of Figure 1.

Figure 4 is an enlarged detail of the lower sleeve which passes over the rubber tube.

Figure 5 is a sectional view of a transparent dust cap.

The valve comprises a nipple 1 of standard length and dimensions which is preferably provided with flat faces 2 on opposite sides, as shown in Figure 2. This nipple is provided with an integral bottom flange 3 which may be provided, if desired, with a V-shaped groove 4 cut inwardly, as indicated in Figure 1. This nipple is of the same diameter throughout and is provided at its upper end with a pair of slits 5 on opposite sides to define tongues 6 hereinafter described in greater detail.

The movable portion of the valve consists of a rubber tube 7 whose lower end is slipped over the upwardly extending apertured projection 8 of the closing washer 9. This lower end of the tube is surrounded by means of a sleeve 10, as shown in greatest detail in Figure 4.

This sleeve is provided with an outwardly extending bottom flange 11 over which the lower end of the rubber tube 7 is folded, as shown in the bottom portion of Figure 4.

The washer 9 is preferably spherical in shape and has its ends slipped into the groove 4. The washer is subsequently partially flattened to force these ends into binding engagement with the slanting faces of the groove 4 and thus to compress the parts into the position shown in Figure 1, and forming an air tight seal, it being understood that an extra packing washer 12 of suitable yielding material may be employed to further insure an air tight seal.

The upper end of the rubber tube 7 is slipped over the beaded projection 13 of a slidable hollow filling tube 14. This end of the rubber tube is held in binding engagement with the portion 13 by means of the sleeve 15 which is crimped or pressed around the rubber tube and the beaded end of the member 13, as shown in Figure 1.

It is to be noted from Figure 1 that a helical spring 16 surrounds the rubber tube 7. Its upper end is received by a flange 17 of the crimped or binding sleeve 15 and its lower end is similarly received by a flange 18 of the lower sleeve 10.

From reference to Figure 4, in illustrating the lower sleeve, it will be seen that the flanges 17 and 18 are formed like threads and permit the spring 16 to be positioned by twisting it while inserting it upon the sleeves, the flanges, thereafter, retaining the spring rigidly in position.

The member 14 is in reality a tube as is evident from a comparison of Figures 1 and 2, and is provided with flat faces 19 on opposite sides by cutting away a portion of the tube body. This tube 14 loosely fits within the nipple 1 and is freely slidable therein. The tongues 6, previously mentioned and integral with the nipple 1, are pressed inwardly, as shown in Figure 1, to loosely and slidably engage the flat faces 19, and to thus prevent relative rotary motion between the filling tube 14 and the nipple 1.

The filling tube 14 is apertured throughout and is provided with a shoulder 20 against which the spider 21 of the standard filling valve 22 may rest, such filling valve having the usual threaded upper portion 23 which is screwed into the correspondingly threaded aperture 24 of the filling tube. A closure cap 25 is screwed upon the upper end of the filling tube 14 when the tube is not used for filling purposes, and such cap may be of standard design, being provided with a gasket or washer 26.

If desired, a transparent dust cap may be provided for the device or any usual type of dust cap member employed. The transparent dust cap is illustrated in Figure 5 and is provided with a base portion 27 equipped with a bottom washer 28 and apertured and threaded, as indicated at 29, so that it may be screwed upon the threaded nipple 1 in the usual manner. This bottom portion carries a glass shell 30 whose upper end is received in a suitable flanged top member 31, such top member being provided with a semispherical inner portion 32, whereby the inner and outer faces of the glass cylinder may be engaged.

The top member 31 is provided with a plurality of downwardly extending spaced arms 33 positioned outside of the glass shell and joined to a threaded sleeve 34 adapted to be screwed upon an externally threaded portion of the member 27.

The operation of the apparatus is as follows:—The filling may be accomplished in the usual manner by unscrewing the cap 25 (see Figure 1) and applying the air hose. After the tire has been inflated, the air hose is removed and the cap 25 replaced in the usual manner.

It is to be noted that the internal pressure of the tire is transmitted to the tube 7, thus causing the tube to elongate against the action of the spring 16 and consequently sliding the filling tube 14 upwardly.

It is to be noted from Figure 2 that the flat faces 19 are provided with graduations to indicate pressure. The pressure, therefore, may be read by reading the last exposed graduations as the member 14 is projected upwardly above the tops of the lips 6.

The simplicity of manufacturing the device is to be particularly noted for in forming the device the filling tube 14 with the rubber tube 7 and spring 16 and other portions in place, is merely slipped into the nipple 1 from its bottom side until the peripheral edges of the washer 9 are located in the groove 4 of the bottom flange 3 of the nipple. Thereafter, all that is necessary to retain this extensible filling tube in place is merely to either compress the washer 9 to slightly flatten it in order to force its edges into binding engagement with the groove 4, or else to spin the adjacent portion of the bottom flange 3 over the washer 9. In order to keep the tube 4 from turning with relation to the nipple 1, it is merely necessary to press the lips or ears 6 inwardly, as shown in Figure 1. Thereafter, the device is complete and is ready for immediate use.

It will be seen that the utmost simplicity of manufacture is attained with this type of device, and that the nipple employed is of standard length and diameter.

It is to be noted further that there is no danger of a gradual leaking of the air from the device, as no pistons are employed but merely a rubber tube whose ends are closed in the manner described in detail above.

It will be seen further that the device has all the appearance of the standard nipple and does not detract from the appearance of the wheel upon which it is employed. Further, all of the conveniences incident to visible pressure indication are attained by this device without resorting to any additional complicated mechanism.

Although the invention has been described in considerable detail, it is to be understood that the invention may be variously embodied and is, therefore, to be limited only as claimed.

We claim:

An inflation valve comprising a nipple having a cylindrical opening from one end to the other, and provided with a flanged base, a filling tube slidably fitting within the opening through said nipple, said filling tube being cylindrical throughout its major position and having a flat face intermediate its ends, said nipple having a pair of slits defining a tongue and said tongue being bent inwardly and slidably contacting with the flat face of said filling tube, and an expansible tube joining the inner end of said filling tube and clamped in the base of the nipple.

In testimony that we claim the foregoing we have hereunto set our hands at Milwaukee, in the county of Milwaukee and State of Wisconsin.

ELMER L. LARSON.
CHARLES A. BRAUNGER.